United States Patent
Shigeta

(10) Patent No.: US 10,752,506 B2
(45) Date of Patent: Aug. 25, 2020

(54) NANOSTRUCTURE DISPERSION LIQUID-CONTAINING CONTAINER, METHOD OF STORING AND METHOD OF TRANSPORTING NANOSTRUCTURE DISPERSION LIQUID, AND METHODS OF PRODUCING COMPOSITE MATERIAL COMPOSITION AND AGGREGATE USING NANOSTRUCTURE DISPERSION LIQUID

(71) Applicant: ZEON CORPORATION, Chiyoda-ku, Tokyo (JP)

(72) Inventor: Masahiro Shigeta, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/064,115

(22) PCT Filed: Dec. 21, 2016

(86) PCT No.: PCT/JP2016/088232
§ 371 (c)(1),
(2) Date: Jun. 20, 2018

(87) PCT Pub. No.: WO2017/115707
PCT Pub. Date: Jul. 6, 2017

(65) Prior Publication Data
US 2019/0010056 A1   Jan. 10, 2019

(30) Foreign Application Priority Data

Dec. 28, 2015   (JP) ................................ 2015-255807

(51) Int. Cl.
| | | |
|---|---|---|
| *C01B 32/174* | (2017.01) | |
| *B65D 77/00* | (2006.01) | |
| *C08J 3/215* | (2006.01) | |
| *C08J 3/205* | (2006.01) | |
| *C08K 3/04* | (2006.01) | |
| *C08J 3/21* | (2006.01) | |
| *B82Y 30/00* | (2011.01) | |
| *B82Y 40/00* | (2011.01) | |

(52) U.S. Cl.
CPC ............ *C01B 32/174* (2017.08); *B65D 77/00* (2013.01); *C08J 3/2053* (2013.01); *C08J 3/212* (2013.01); *C08J 3/215* (2013.01); *C08K 3/041* (2017.05); *B82Y 30/00* (2013.01); *B82Y 40/00* (2013.01); *C08J 2309/04* (2013.01); *C08J 2325/06* (2013.01); *C08K 2201/011* (2013.01)

(58) Field of Classification Search
CPC . C01B 32/174; C08K 3/041; C08K 2201/011; C08J 3/212; C08J 2309/04; C08J 2325/06; B82Y 30/00; B82Y 40/00
USPC ........................................................ 252/500
See application file for complete search history.

(56) References Cited

U.S. PATENT DOCUMENTS

| | | | |
|---|---|---|---|
| 2008/0318049 A1 | 12/2008 | Hata et al. | |
| 2013/0052449 A1 | 2/2013 | Sen et al. | |
| 2013/0224934 A1 | 8/2013 | Roberts et al. | |
| 2013/0334075 A1* | 12/2013 | Young .................... | B65D 85/70 206/205 |
| 2015/0183189 A1* | 7/2015 | Kim ........................ | B32B 7/005 428/148 |
| 2016/0251225 A1* | 9/2016 | Takai .................... | C01B 32/178 428/402 |

FOREIGN PATENT DOCUMENTS

| | | | |
|---|---|---|---|
| CN | 101607734 | A | 12/2009 |
| CN | 104583114 | A | 4/2015 |
| CN | 105658573 | A | 6/2016 |
| JP | 2005200723 | A | 7/2005 |
| JP | 2006016222 | A | 1/2006 |
| JP | 2008008893 | A | 1/2008 |
| JP | 2010097794 | A | 4/2010 |
| JP | 2010254546 | A | 11/2010 |
| JP | 2013519620 | A | 5/2013 |
| JP | 2013230951 | A | 11/2013 |
| JP | 2015527259 | A | 9/2015 |
| WO | 2006011655 | A1 | 2/2006 |
| WO | 2011100661 | A1 | 8/2011 |
| WO | 2015064772 | A1 | 5/2015 |

OTHER PUBLICATIONS

Feb. 28, 2017, International Search Report issued in the International Patent Application No. PCT/JP2016/088232.

Jul. 3, 2018, International Preliminary Report on Patentability issued in the International Patent Application No. PCT/JP2016/088232.

\* cited by examiner

*Primary Examiner* — Khanh T Nguyen

(74) *Attorney, Agent, or Firm* — Kenja IP Law PC

(57) ABSTRACT

A technique of suppressing a decrease in dispersibility of nanostructures in a nanostructure dispersion liquid that is stored or transported after production is provided. A nanostructure dispersion liquid-containing container is formed by filling an airtight container with a nanostructure dispersion liquid containing nanostructures and a dispersion medium. The nanostructures include at least one selected from the group consisting of nanocarbons, nanofibers, and nanowires, and a filling rate of the nanostructure dispersion liquid is 97 vol % or more.

10 Claims, No Drawings

NANOSTRUCTURE DISPERSION LIQUID-CONTAINING CONTAINER, METHOD OF STORING AND METHOD OF TRANSPORTING NANOSTRUCTURE DISPERSION LIQUID, AND METHODS OF PRODUCING COMPOSITE MATERIAL COMPOSITION AND AGGREGATE USING NANOSTRUCTURE DISPERSION LIQUID

TECHNICAL FIELD

The present disclosure relates to a nanostructure dispersion liquid-containing container formed by filling a container with a nanostructure dispersion liquid, a method of storing a nanostructure dispersion liquid, a method of transporting a nanostructure dispersion liquid, and methods of producing a composite material composition and an aggregate using a nanostructure dispersion liquid.

BACKGROUND

In recent years, a variety of nanostructures such as nanocarbons, nanofibers, and nanowires have been attracting attention as materials excellent in various characteristics such as mechanical characteristics. Of these, nanocarbons and especially fibrous carbon nanostructures such as carbon nanotubes (hereafter also referred to as "CNTs") have been attracting attention as materials excellent in electrical conductivity, thermal conductivity, and mechanical characteristics.

However, nanostructures such as CNTs are fine structures with diameters in nanometer size, and therefore are poor in handleability and processability when used alone. Hence, a plurality of nanostructures are combined into an aggregate in film form as an example, or nanostructures are compound with a polymer material such as resin or rubber or metal to form a composite material. The resultant aggregate or composite material is then put to various uses. As a method of forming an aggregate of nanostructures, a method of removing, from a nanostructure dispersion liquid obtained by dispersing nanostructures in a dispersion medium, the dispersion medium has been proposed. As a method of forming a composite material including nanostructures, a method of precipitating or depositing, from a composite material composition obtained by mixing a matrix material such as a polymer material and a nanostructure dispersion liquid, a composite material has been proposed.

To achieve excellent characteristics of an aggregate of nanostructures or a composite material, there has been demand for a dispersion liquid obtained by favorably dispersing nanostructures in a dispersion medium, as a nanostructure dispersion liquid used to form an aggregate or a composite material. As a method of producing a nanostructure dispersion liquid, for example, a method of dispersing nanostructures in a dispersion medium using an ultrasonic homogenizer, a jet mill, or the like has been proposed (for example, see PTL 1 to PTL 4).

CITATION LIST

Patent Literatures

PTL 1: JP 2006-16222 A
PTL 2: JP 2010-254546 A
PTL 3: JP 2013-230951 A
PTL 4: JP 2010-097794 A

SUMMARY

Technical Problem

By using the above-mentioned production method, a nanostructure dispersion liquid having excellent dispersibility of nanostructures can be produced.

However, especially in the case of industrial mass production in a factory and the like, a produced nanostructure dispersion liquid is often stored for a long period of time or transported to another location before it is used to form an aggregate or a composite material. The nanostructure dispersion liquid after the storage or the transport tends to be lower in dispersibility of nanostructures than immediately after the production.

There has thus been demand for a technique of suppressing a decrease in dispersibility of nanostructures in a nanostructure dispersion liquid.

Solution to Problem

The inventor conducted extensive studies to solve the problems stated above, and discovered that, in a nanostructure dispersion liquid, nanostructures aggregate due to environmental changes during storage or vibrations during transport, which causes a decrease in dispersibility of nanostructures. The inventor then conducted further studies, and discovered that, by filling an airtight container used for storage or transport of the nanostructure dispersion liquid with at least a predetermined amount of the nanostructure dispersion liquid, the influences of environmental changes during storage or vibrations during transport can be reduced to suppress a decrease in dispersibility of nanostructures.

To advantageously solve the problems stated above, a presently disclosed nanostructure dispersion liquid-containing container is a nanostructure dispersion liquid-containing container formed by filling an airtight container with a nanostructure dispersion liquid containing nanostructures and a dispersion medium, wherein the nanostructures include at least one selected from the group consisting of nanocarbons, nanofibers, and nanowires, and a filling rate of the nanostructure dispersion liquid is 97 vol % or more. By limiting the filling rate of the nanostructure dispersion liquid in the airtight container to 97 vol % or more, a decrease in dispersibility of nanostructures during storage or transport of the nanostructure dispersion liquid can be suppressed.

The nanostructures are preferably a nanocarbon, and more preferably fibrous carbon nanostructures. Preferably, the fibrous carbon nanostructures exhibit a convex upward shape in a t-plot obtained from an adsorption isotherm.

As used herein, "fibrous" denotes a structure with an aspect ratio of 10 or more.

In the presently disclosed nanostructure dispersion liquid-containing container, the nanostructure dispersion liquid may further contain a molecular additive. With the inclusion of the molecular additive, the dispersibility of nanostructures in the nanostructure dispersion liquid can be enhanced.

In the presently disclosed nanostructure dispersion liquid-containing container, the nanostructure dispersion liquid may further contain ion particles. With the inclusion of the ion particles, the dispersibility of nanostructures in the nanostructure dispersion liquid can be enhanced.

Preferably, in the presently disclosed nanostructure dispersion liquid-containing container, the airtight container is made of resin or metal.

To advantageously solve the problems stated above, a presently disclosed method of storing a nanostructure dispersion liquid comprises storing a nanostructure dispersion liquid in a state of the nanostructure dispersion liquid-containing container described above. By storing the nanostructure dispersion liquid in a state of the nanostructure dispersion liquid-containing container described above, a decrease in dispersibility of nanostructures during storage can be suppressed.

To advantageously solve the problems stated above, a presently disclosed method of transporting a nanostructure dispersion liquid comprises transporting a nanostructure dispersion liquid in a state of the nanostructure dispersion liquid-containing container described above. By transporting the nanostructure dispersion liquid in a state of the nanostructure dispersion liquid-containing container described above, a decrease in dispersibility of nanostructures during transport can be suppressed.

To advantageously solve the problems stated above, a presently disclosed method of producing a composite material composition comprises: extracting a nanostructure dispersion liquid stored or transported by the method described above, from an airtight container; and mixing the extracted nanostructure dispersion liquid and a matrix material to obtain a composite material composition. By using the nanostructure dispersion liquid stored or transported by the method described above, a composite material composition capable of forming a composite material having favorable material characteristics can be obtained.

To advantageously solve the problems stated above, a presently disclosed method of producing an aggregate of nanostructures comprises: extracting a nanostructure dispersion liquid stored or transported by the method described above, from an airtight container; and removing a dispersion medium from the extracted nanostructure dispersion liquid to form an aggregate of nanostructures. By using the nanostructure dispersion liquid stored or transported by the method described above, an aggregate of nanostructures having excellent characteristics can be formed.

Advantageous Effect

It is therefore possible to, even in the case of storing or transporting a nanostructure dispersion liquid-containing container, suppress a decrease in dispersibility of nanostructures contained in a nanostructure dispersion liquid in the container. Hence, the nanostructure dispersion liquid can be favorably stored or transported while ensuring dispersibility of nanostructures.

Moreover, with the presently disclosed method of producing a composite material composition or method of producing an aggregate of nanostructures, a composite material composition or an aggregate of nanostructures having excellent characteristics can be yielded.

DETAILED DESCRIPTION

One of the disclosed embodiments is described in detail below.

A presently disclosed nanostructure dispersion liquid-containing container is suitable for use when storing or transporting a nanostructure dispersion liquid containing nanostructures and a dispersion medium. The nanostructure dispersion liquid that is put in the container so as to be easily stored or transported can be used in the production of a composite material composition or an aggregate of nanostructures by a presently disclosed method of producing a composite material composition or method of producing an aggregate of nanostructures.

Nanostructure Dispersion Liquid-Containing Container

The presently disclosed nanostructure dispersion liquid-containing container includes: an airtight container; and a nanostructure dispersion liquid with which the airtight container is filled, wherein a filling rate of the nanostructure dispersion liquid is 97 vol % or more. With the presently disclosed nanostructure dispersion liquid-containing container, even in the case of storing or transporting the nanostructure dispersion liquid-containing container, a decrease in dispersibility of nanostructures contained in the nanostructure dispersion liquid in the container can be suppressed.

Although the reason that a decrease in dispersibility of nanostructures can be suppressed in the presently disclosed nanostructure dispersion liquid-containing container is not clear, the reason is presumed to be that, since the filling rate of the nanostructure dispersion liquid is high, i.e. 97 vol % or more, the nanostructure dispersion liquid in the container is less affected by environmental changes (e.g. volatilization of the dispersion medium) during storage or vibrations during transport, and aggregation of nanostructures in the container is unlikely to occur.

Airtight Container

The airtight container with which the nanostructure dispersion liquid is filled may be, but is not limited to, any airtight container that can be closed after being filled with the nanostructure dispersion liquid, such as an airtight container having a closable inlet. Examples of the airtight container include a container made of glass such as a glass bottle with a lid, a container made of resin such as a resin tank with a lid, and a container made of metal such as a metallic can with a lid. As the container made of glass, a glass container coated with resin or the like on the outside or the inside may be used, in terms of making the glass container shatterproof. Alternatively, the airtight container may be, for example, a container made of metal and lined with resin on its inner surface. A lid of the airtight container may be single or multiple. Moreover, the lid may be equipped with a valve or a cock for liquid injection/discharge. In the case where the airtight container is a container with a lid, the container body and the lid may be made of different materials.

Of the examples listed above, in terms of handleability and safety during storage and transport, the airtight container is preferably a container made of metal, a container made of resin, or a container lined with resin on its inner surface. In terms of preventing metallic impurities from entering the nanostructure dispersion liquid, the airtight container is more preferably a container made of resin or a container lined with resin on its inner surface.

The capacity of the airtight container may be, but is not limited to, 200 L or less. In particular, in terms of handleability during storage and transport, the capacity of the airtight container is preferably 50 L or less, more preferably 30 L or less, and further preferably 20 L or less. The space other than the part containing the nanostructure dispersion liquid in the airtight container may be filled with air, but is preferably replaced with inert gas such as nitrogen gas or argon gas.

Nanostructure Dispersion Liquid

The nanostructure dispersion liquid with which the airtight container is filled contains nanostructures and a dispersion medium, and optionally further contains additives such as a dispersant, a molecular additive, and ion particles.

Nanostructures

Examples of the nanostructures include: nanocarbons such as fullerene, graphene, and fibrous carbon nanostructures; nanofibers such as cellulose nanofibers and boron nitride nanotubes; and nanowires such as silver nanowires, without being limited thereto. One of these nanostructures may be used individually, or two or more of these nanostructures may be used as a mixture.

Of the examples listed above, the nanostructures are preferably a nanocarbon, and more preferably fibrous carbon nanostructures. This is because a nanocarbon such as fibrous carbon nanostructures has excellent electrical conductivity, thermal conductivity, and mechanical characteristics.

Fibrous Carbon Nanostructures

Examples of the fibrous carbon nanostructures include carbon nanotubes, carbon nanofibers, carbon nanohorns, and vapor-grown carbon fibers, without being limited thereto. One of these fibrous carbon nanostructures may be used individually, or two or more of these fibrous carbon nanostructures may be used as a mixture.

Of these, the fibrous carbon nanostructures are more preferably fibrous carbon nanostructures including carbon nanotubes. This is because fibrous carbon nanostructures including carbon nanotubes have excellent electrical conductivity, thermal conductivity, and mechanical characteristics.

The fibrous carbon nanostructures including carbon nanotubes that are suitable for use as the fibrous carbon nanostructures may be composed solely of carbon nanotubes, or may be a mixture of carbon nanotubes and fibrous carbon nanostructures other than carbon nanotubes.

The carbon nanotubes in the fibrous carbon nanostructures may include, but are not limited to, single-walled carbon nanotubes and/or multi-walled carbon nanotubes. The carbon nanotubes are preferably single- to up to 5-walled carbon nanotubes, and more preferably single-walled carbon nanotubes. This is because single-walled carbon nanotubes have excellent electrical conductivity, thermal conductivity, and mechanical characteristics as compared with multi-walled carbon nanotubes.

The fibrous carbon nanostructures are preferably carbon nanostructures for which a ratio ($3\sigma/Av$) of the diameter standard deviation ($\sigma$) multiplied by 3 ($3\sigma$) relative to the average diameter (Av) is more than 0.20 and less than 0.60, more preferably carbon nanostructures for which $3\sigma/Av$ is more than 0.25, and further preferably carbon nanostructures for which $3\sigma/Av$ is more than 0.50. This is because fibrous carbon nanostructures for which $3\sigma/Av$ is more than 0.20 and less than 0.60 have excellent electrical conductivity, thermal conductivity, and mechanical characteristics.

Herein, the "average diameter (Av) of the fibrous carbon nanostructures" and the "diameter standard deviation ($\sigma$: sample standard deviation) of the fibrous carbon nanostructures" can each be obtained by measuring the diameters (external diameters) of 100 randomly selected fibrous carbon nanostructures using a transmission electron microscope. The average diameter (Av) and the standard deviation ($\sigma$) of the fibrous carbon nanostructures may be adjusted by changing the production method and the production conditions of the fibrous carbon nanostructures, or adjusted by combining a plurality of types of fibrous carbon nanostructures obtained by different production methods.

The fibrous carbon nanostructures that are typically used take a normal distribution when a plot is made of diameter measured as described above on a horizontal axis and probability density on a vertical axis, and a Gaussian approximation is made.

Furthermore, the fibrous carbon nanostructures preferably exhibit a radial breathing mode (RBM) peak when evaluated by Raman spectroscopy. Note that an RBM is not present in the Raman spectrum of fibrous carbon nanostructures composed only of multi-walled carbon nanotubes having three or more walls.

Moreover, in a Raman spectrum of the fibrous carbon nanostructures, a ratio (G/D ratio) of G band peak intensity relative to D band peak intensity is preferably 1 or more and 20 or less. This is because fibrous carbon nanostructures with a G/D ratio of 1 or more and 20 or less have excellent electrical conductivity, thermal conductivity, and mechanical characteristics.

The average diameter (Av) of the fibrous carbon nanostructures is preferably 0.5 nm or more and further preferably 1 nm or more, and preferably 15 nm or less and further preferably 10 nm or less. If the average diameter (Av) of the fibrous carbon nanostructures is 0.5 nm or more, aggregation of the fibrous carbon nanostructures is suppressed, and the dispersibility of the fibrous carbon nanostructures in the dispersion liquid can be enhanced. Moreover, fibrous carbon nanostructures with an average diameter (Av) of 15 nm or less have excellent electrical conductivity, thermal conductivity, and mechanical characteristics.

The average length of the fibrous carbon nanostructures at the time of synthesis is preferably 100 μm or more and 5000 μm or less. Fibrous carbon nanostructures that have a longer structure length at the time of synthesis tend to be more easily damaged by breaking, severing, or the like during dispersion. Therefore, it is preferable that the average length of the structures at the time of synthesis is 5000 μm or less.

The BET specific surface area of the fibrous carbon nanostructures is preferably 400 m$^2$/g or more and more preferably 800 m$^2$/g or more, and preferably 2500 m$^2$/g or less and more preferably 1200 m$^2$/g or less. This is because fibrous carbon nanostructures with a BET specific surface area of 400 m$^2$/g or more have excellent electrical conductivity, thermal conductivity, and mechanical characteristics. Moreover, if the BET specific surface area of the fibrous carbon nanostructures is 2500 m$^2$/g or less, the dispersibility of fibrous carbon nanostructures in the dispersion liquid can be further enhanced.

As used herein, "BET specific surface area" refers to a nitrogen adsorption specific surface area measured by the BET method.

In accordance with the super growth method described later, the fibrous carbon nanostructures are obtained, on a substrate having thereon a catalyst layer for carbon nanotube growth, in the form of an aggregate wherein fibrous carbon nanostructures are aligned substantially perpendicularly to the substrate (aligned aggregate). The mass density of the fibrous carbon nanostructures in the form of such an aggregate is preferably 0.002 g/cm$^3$ or more and 0.2 g/cm$^3$ or less. A mass density of 0.2 g/cm$^3$ or less allows the fibrous carbon nanostructures to be homogeneously dispersed in the dispersion liquid because binding among the fibrous carbon nanostructures is weakened. A mass density of 0.002 g/cm$^3$ or more improves the unity of the fibrous carbon nanostructures, thus preventing the fibrous carbon nanostructures from becoming unbound and making the fibrous carbon nanostructures easier to handle.

The fibrous carbon nanostructures preferably include a plurality of micropores. In particular, the fibrous carbon nanostructures preferably include micropores that have a pore diameter of less than 2 nm. The amount of these micropores as measured in terms of micropore volume determined by the method described below is preferably 0.40 mL/g or more, more preferably 0.43 mL/g or more, and further preferably 0.45 mL/g or more, with the upper limit being generally on the order of 0.65 mL/g. The presence of such micropores in the fibrous carbon nanostructures further suppresses aggregation of the fibrous carbon nanostructures in the dispersion liquid, and further enhances the dispersibility of the fibrous carbon nanostructures in the dispersion liquid. Micropore volume can be adjusted, for example, by appropriate alteration of the production method and the production conditions of the fibrous carbon nanostructures.

Herein, "micropore volume (Vp)" can be calculated using Equation (I): $Vp=(V/22414)\times(M/\rho)$ by measuring a nitrogen adsorption isotherm of the fibrous carbon nanostructures at liquid nitrogen temperature (77 K) with the amount of adsorbed nitrogen at a relative pressure $P/P0=0.19$ defined as V, where P is a measured pressure at adsorption equilibrium, and P0 is a saturated vapor pressure of liquid nitrogen at time of measurement. In Equation (I), M is a molecular weight of 28.010 of the adsorbate (nitrogen), and $\rho$ is a density of 0.808 g/cm$^3$ of the adsorbate (nitrogen) at 77 K. Micropore volume can be measured, for example, using BELSORP®-mini (BELSORP is a registered trademark in Japan, other countries, or both) manufactured by Bel Japan Inc.

The fibrous carbon nanostructures preferably exhibit a convex upward shape in a t-plot obtained from an adsorption isotherm. The fibrous carbon nanostructures more preferably have not undergone opening formation treatment and exhibit a convex upward shape in a t-plot. This is because fibrous carbon nanostructures that exhibit a convex upward shape in a t-plot have excellent electrical conductivity, thermal conductivity, and mechanical characteristics.

The t-plot can be obtained from the adsorption isotherm of the fibrous carbon nanostructures measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

In a substance having pores at its surface, the growth of the adsorbed layer of nitrogen gas is categorized into the following processes (1) to (3). The gradient of the t-plot changes in accordance with these processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

The t-plot forming a convex upward shape is on a straight line passing through the origin in a region in which the average adsorbed nitrogen gas layer thickness t is small, but, as t increases, the plot deviates downward from the straight line. The fibrous carbon nanostructures having such a t-plot shape indicate that the fibrous carbon nanostructures have a large internal specific surface area as a proportion of total specific surface area and that there are a large number of openings in the carbon nanostructures constituting the fibrous carbon nanostructures.

The bending point of the t-plot of the fibrous carbon nanostructures is preferably in a range satisfying $0.2 \leq t$ (nm)$\leq 1.5$, more preferably in a range of $0.45 \leq t$ (nm)$\leq 1.5$, and further preferably in a range of $0.55 \leq t$ (nm)$\leq 1.0$.

Herein, the "position of the bending point" is an intersection point of an approximated straight line A for the above-mentioned process (1) and an approximated straight line B for the above-mentioned process (3).

The fibrous carbon nanostructures preferably have a ratio of an internal specific surface area S2 to a total specific surface area S1 (S2/S1) of 0.05 or more and 0.30 or less, obtained from the t-plot.

Each of the total specific surface area S1 and the internal specific surface area S2 of the fibrous carbon nanostructures is not limited, but S1 is preferably 400 m$^2$/g or more and 2500 m$^2$/g or less and further preferably 800 m$^2$/g or more and 1200 m$^2$/g or less, and S2 is preferably 30 m$^2$/g or more and 540 m$^2$/g or less.

The total specific surface area S1 and the internal specific surface area S2 of the fibrous carbon nanostructures can be found from the t-plot. First, the total specific surface area S1 can be found from the gradient of the approximated straight line corresponding to the process (1) and an external specific surface area S3 can be found from the gradient of the approximated straight line corresponding to the process (3). The internal specific surface area S2 can then be calculated by subtracting the external specific surface area S3 from the total specific surface area S1.

The measurement of the adsorption isotherm, the preparation of the t-plot, and the calculation of the total specific surface area S1 and the internal specific surface area S2 based on t-plot analysis for the fibrous carbon nanostructures can be performed using, for example, BELSORP®-mini, a commercially available measurement instrument available from Bel Japan Inc.

The above-described fibrous carbon nanostructures can be efficiently produced, for example, according to the method (super growth method, see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method as the above-described fibrous carbon nanostructures are also referred to as "SGCNTs."

The fibrous carbon nanostructures may be composed solely of SGCNTs, or may be composed of SGCNTs and non-cylindrical carbon nanostructures. Specifically, the fibrous carbon nanostructures may include single- or multi-walled flattened cylindrical carbon nanostructures having over the entire length a tape portion where inner walls are in close proximity to each other or bonded together (hereinafter such carbon nanostructures are also referred to as "graphene nanotapes (GNTs)").

GNT is presumed to be a substance having substantially over the entire length a tape portion where inner walls are in close proximity to each other or bonded together since it has been synthesized, and having a network of 6-membered carbon rings in the form of flattened cylindrical shape. The phrase "having substantially over the entire length" refers to "having a tape portion over 60% or more in the case where the entire length is 100%. GNT's flattened cylindrical structure and the presence of a tape portion where inner walls are in close proximity to each other or bonded together in the GNT can be confirmed, for example, as follows: GNT and fullerene (C60) are sealed into a quartz tube and subjected to heat treatment under reduced pressure (fullerene insertion treatment) to form a fullerene-inserted GNT, followed by observation under a transmission electron microscope (TEM) of the fullerene-inserted GNT to confirm the presence of part in the GNT where no fullerene is inserted (tape portion).

The shape of the GNT is preferably such that it has a tape portion at the central part in the width direction. More preferably, the shape of a cross-section of the GNT, perpendicular to the extending direction (axial direction), is such that the maximum dimension in a direction perpendicular to the longitudinal direction of the cross section is larger in the vicinity of opposite ends in the longitudinal direction of the cross section than in the vicinity of the central part in the longitudinal direction of the cross section. Most preferably, a cross-section of the GNT perpendicular to the extending direction (axial direction) has a dumbbell shape.

The term "vicinity of the central part in the longitudinal direction of a cross section" used for the shape of a cross section of GNT refers to a region within 30% of longitudinal dimension of the cross section from the line at the longitudinal center of the cross section (i.e., a line that passes through the longitudinal center of the cross section and is perpendicular to the longitudinal line in the cross section). The term "vicinity of opposite ends in the longitudinal direction of a cross section" refers to regions outside the "vicinity of the central part in the longitudinal direction of a cross section" in the longitudinal direction.

Fibrous carbon nanostructures including GNTs as non-cylindrical carbon nanostructures can be obtained by, when synthesizing CNTs by the super growth method using a substrate having thereon a catalyst layer (hereinafter also referred to as a "catalyst substrate"), forming the catalyst substrate using a specific method. Specifically, fibrous carbon nanostructures including GNTs can be obtained through synthesis of CNTs by the super growth method using a catalyst substrate prepared as follows: Coating liquid A containing an aluminum compound is applied on a substrate and dried to form an aluminum thin film (catalyst support layer) on the substrate, followed by application of coating liquid B containing an iron compound on the aluminum thin film and drying of the coating liquid B at a temperature of 50° C. or less to form an iron thin film (catalyst layer) on the aluminum thin film.

The concentration of metal impurities contained in the fibrous carbon nanostructures is preferably less than $1\times10^{18}$ atoms/cm$^3$, and more preferably less than $15\times10^{10}$ atoms/cm$^3$, in terms of reducing impurities in the fibrous carbon nanostructure dispersion liquid and further improving the dispersibility of the fibrous carbon nanostructures.

Herein, metal impurities include, for example, a metal catalyst used in the production of the fibrous carbon nanostructures. Examples include metal elements to which alkali metal, alkaline-earth metal, groups 3 to 13, and lanthanoid group belong, metal elements such as Si, Sb, As, Pb, Sn, and Bi, and metal compounds containing these elements. More specific examples include metal elements such as Al, Sb, As, Ba, Be, Bi, B, Cd, Ca, Cr, Co, Cu, Ga, Ge, Fe, Pb, Li, Mg, Mn, Mo, Ni, K, Na, Sr, Sn, Ti, W, V, Zn, and Zr, and metal compounds containing these elements.

The concentration of metal impurities can be measured, for example, by a transmission electron microscope (TEM), a scanning electron microscope (SEM), energy dispersive X-ray analysis (EDAX), a vapor-phase decomposition device and ICP mass spectrometry (VPD, ICP/MS), etc. ICP mass spectrometry (ICP/MS) is typically used for the measurement as it enables accurate measurement.

In terms of further improving the dispersibility of the fibrous carbon nanostructures in the dispersion liquid, the fibrous carbon nanostructures preferably do not substantially contain particulate impurities with a particle diameter of more than 500 nm, more preferably do not substantially contain particulate impurities with a particle diameter of more than 300 nm, further preferably do not substantially contain particulate impurities with a particle diameter of more than 100 nm, and particularly preferably do not substantially contain particulate impurities with a particle diameter of more than 45 nm.

The presence/absence or particulate impurities can be measured by applying a fibrous carbon nanostructure dispersion liquid onto a substrate and observing the surface using, for example, "surfscan" manufactured by KLA Tencor Corporation. As used herein, "not substantially containing particulate impurities" refers to the case where the content of particulate impurities in the fibrous carbon nanostructures is 1 mass % or less.

Dispersion Medium

Examples of the dispersion medium in which the nanostructures are dispersed include: water; alcohols such as methanol, ethanol, n-propanol, isopropanol, n-butanol, isobutanol, t-butanol, pentanol, hexanol, heptanol, octanol, nonanol, decanol, amyl alcohol, methoxy propanol, propylene glycol, and ethylene glycol; ketones such as acetone, methyl ethyl ketone, and cyclohexanone; esters such as ethyl acetate, butyl acetate, ethyl lactate, esters of α-hydroxy carboxylic acids, and benzyl benzoate; ethers such as diethyl ether, dioxane, tetrahydrofuran, and monomethyl ether; amide-based polar organic solvents such as N,N-dimethyl-formamide, dimethylsulfoxide, dimethylacetoamide, and N-methylpyrrolidone; aromatic hydrocarbons such as toluene, xylene, chlorobenzene, ortho-dichlorobenzene, and para-dichlorobenzene; and salicylaldehyde, dimethylsulfoxide, 4-methyl-2-pentanone, N-methylpyrrolidone, γ-butyrolactone, and tetramethyl ammonium hydroxide, without being limited thereto. Of these, water or dimethylacetamide is preferable, in terms of particularly excellent dispersibility of nanostructures. One of these dispersion media may be used individually, or two or more of these dispersion media may be used as a mixture.

Additives

The additives that may be optionally blended in the nanostructure dispersion liquid may be, but are not limited to, known additives such as a dispersant, a molecular additive, and ion particles.

In terms of improving the characteristics (in particular, electrical conductivity, etc.) of an aggregate or a composite material formed using the nanostructure dispersion liquid, the concentration of the additives contained in the nanostructure dispersion liquid is preferably 1 mass % or less.

Dispersant

The dispersant may be any known dispersant that can assist the dispersion of the nanostructures. Specifically, examples of an aqueous dispersant suitably used in the case where the dispersion medium contains water include a surfactant and polysaccharides. Of these, a surfactant is more preferable, and an anionic surfactant such as sodium lauryl sulfate is further preferable. This is because it provides excellent dispersibility of nanostructures. Examples of a non-aqueous dispersant suitably used in the case where the dispersion medium is composed of an organic solvent include a π-conjugated polymer and a polymer that has an ethylene chain as a main chain. Of these, a polymer that has an ethylene chain as a main chain (such as polystyrene and polyvinyl pyrrolidone) is preferable for its ready availability.

Molecular Additive

The molecular additive, when forming an aggregate of nanostructures on a substrate using the nanostructure dispersion liquid, improves close adherence between the aggregate and the substrate. The molecular additive may be any molecular additive such as those described in the specification of US 2013/0224934 A1, without being limited thereto. The molecular additive is preferably a molecular additive that dissolves in the dispersion medium contained in the nanostructure dispersion liquid. For example, in the case where water is used as the dispersion medium, the molecular additive is preferably water-soluble.

The molecular additive preferably does not contain any metal ion. If the nanostructure dispersion liquid contains metallic impurities, the electrical conductivity of an aggregate or a composite material formed using the dispersion liquid may decrease. It is therefore preferable that the molecular additive does not contain any metal ion or any metal oxide and metal complex that can serve as a metal ion source.

The molecular additive is preferably a molecular additive that does not decrease the stability of the nanostructure dispersion liquid.

As the molecular additive, at least any of a compound that can form an oxide in the nanostructure dispersion liquid and the oxide itself is preferably used. It is more preferable to use, as the molecular additive, at least one selected from the group consisting of: (1) a compound containing a group 14 element and an oxygen atom in a molecule, and is soluble in the nanostructure dispersion liquid; (2) a group 14 element-containing compound that can form an oxide of a group 14 element in the nanostructure dispersion liquid; and (3) an oxide of a group 14 element itself. As the group 14 element, at least one selected from the group consisting of Si, Ge, Sn, and Pb is further preferable. Specifically, for example, it is further preferable to use a molecule that includes at least one group 14 element selected from the group consisting of Si, Ge, Sn, and Pb and in which at least three out of four atomic bonds of the group 14 element are bonded directly to at least one atom selected from the group consisting of O, N, P, F, Cl, Br, I, and H.

Examples of molecular additives that can be used include: silicon oxides such as $SiO_2$; silicon halides such as $SiCl_4$; silicon alkoxides such as silicon tetraethoxide; and dichlorosilane. Moreover, for example, a cage type compound containing an O atom and at least eight Si atoms in a molecule may be used as the molecular additive. Examples of cage type compounds that can be used include silsesquioxane. Silsesquioxane can take various solid shapes such as a cube, a hexagonal prism, and an octagonal prism. As used herein, the "cage type" molecule refers to the case where the atoms constituting the molecule are covalently bonded to form a symmetrical polyhedron.

The silsesquioxane may have one or more substituents bonded to a Si atom. Examples of the substituent include hydrogen, alkyl group, alkenyl group, aryl group, arylene group, —O—, —$CH_2CH_2(OCH_2CH_2)_mOCH_3$ (m to 13.3), —$CH_2CH_2CH_2N^+H_3Cl^-$, and —$CH_2CH_2CH_2$—NH—C(=$CH_2$)—CHCHCOOH. As the silsesquioxane having one or more substituents, octakis(tetramethylammonium)-T8-silsesquioxane (also referred to as PSS hydrate-octakis(tetramethylammonium) substitution) is preferably used.

Likewise, a cage type compound containing an O atom and at least eight Ge atoms in a molecule may be used as the molecular additive. Examples of such a cage type compound include germylsesquioxane. Examples that can be used as the molecular additive include: germanium oxides such as $GeO_2$ and $GeO_2$ hydrate; germanium halides such as $GeCl_4$; germanium hydrides; and heteroatomic ligand-containing germanium compounds such as alkoxide, amide, and carboxylate. Examples of heteroatomic ligand-containing germanium compounds include: germanium alkoxides such as germanium tetramethoxide, germanium tetraethoxide, and germanium tetraisopropoxide; and germanium carboxylates such as bis(2-carboxyethylgermanium)sesquioxide.

Tin oxide, lead oxide, or the like may also be used as the molecular additive.

Ion Particles

The ion particles hinder van der Waals interaction and π-π interaction among individual nanostructures, thus enhancing the dispersibility of the nanostructures in the nanostructure dispersion liquid.

The ion particles may be, but are not limited to, those described in WO 2011/100661 A1. Specifically, as the ion particles, at least one selected from the group consisting of ammonium nitrate, ammonium carbonate, ammonium bicarbonate, ammonium formate, ammonium acetate, ionic organic species, and ionic polymer is preferably used. The use of such ion particles reliably hinders van der Waals interaction and π-π interaction among individual nanostructures, and further enhances the dispersibility of the nanostructures in the dispersion liquid.

Method of Producing Nanostructure Dispersion Liquid

The nanostructure dispersion liquid with which the airtight container is filled can be produced, for example, by any production method including: a step of producing a coarse dispersion liquid containing nanostructures, a dispersion medium, and an optional additive; and a step of subjecting the coarse dispersion liquid to dispersion treatment to disperse the nanostructures, without being limited thereto. The nanostructure dispersion liquid may be produced by subjecting the coarse dispersion liquid to optional dispersion treatment such as ultrasonic treatment and then to centrifuging and supernatant liquid collection. The nanostructure dispersion liquid may be produced by optionally subjecting the coarse dispersion liquid to filtration treatment.

Prior to the production of the coarse dispersion liquid, optional purification treatment may be performed on the nanostructures to remove impurities such as metal and amorphous carbon. Examples of purification treatment for separating metal include purification treatment and magnetic purification treatment of dispersing nanostructures in an acid solution of hydrogen peroxide, hydrochloric acid, or the like and dissolving metallic impurities. Examples of pretreatment as purification treatment for separating impurities such as amorphous carbon include: high-speed centrifugal treatment using an ultrahigh-speed centrifuge or the like; filtration treatment by gravity filtration, cross flow filtration, vacuum filtration, or the like; non-fullerene carbon material selective oxidation; and combinations thereof.

Moreover, the nanostructures may be modified before the production of the coarse dispersion liquid. As used herein, "modification" refers to newly introducing a functional group into the nanostructures. Examples of modification techniques include plasma treatment in a nitrogen atmosphere, plasma treatment in an air atmosphere, ozone treatment, oxidation treatment with nitric acid, and oxidation treatment with sulfuric acid. Through such treatment, a functional group such as hydroxyl group, carboxyl group, ketone group, or amino group is introduced to the nanostructure surfaces.

An alternative production method may be a method of producing a nanostructure dispersion liquid containing nanostructures and a dispersion medium wherein the nanostructures include at least one selected from the group consisting of nanocarbons, nanofibers, and nanowires, the method including: a step of subjecting the nanostructures to modification treatment to obtain modified nanostructures; and a step of producing a coarse dispersion liquid containing the obtained modified nanostructures, a dispersion medium, an optional additive, and the like. In this case, the production method may further include a step of subjecting the coarse dispersion liquid to dispersion treatment to disperse the nanostructures, as with the foregoing method.

Method of Producing Coarse Dispersion Liquid

The coarse dispersion liquid can be obtained by adding the nanostructures and the optional additive to the dispersion medium and mixing them using a mixer or the like without applying pressure thereto. The coarse dispersion liquid is preferably prepared by a treatment method that minimizes damage to the nanostructures.

Dispersion Treatment for Coarse Dispersion Liquid

The dispersion treatment method for the coarse dispersion liquid may be, but is not limited to, a known dispersion treatment method used for dispersion of a nanostructure-containing liquid such as dispersion treatment that brings about a cavitation effect or dispersion treatment that brings about a crushing effect.

The "dispersion treatment that brings about a cavitation effect" is a dispersion method that utilizes shock waves caused by the rupture of vacuum bubbles formed in water when high energy is applied to the liquid. Specific examples of the dispersion treatment that brings about a cavitation effect include dispersion treatment using ultrasound, dispersion treatment using a jet mill, and dispersion treatment using high-shear stirring.

The "dispersion treatment that brings about a crushing effect" uniformly disperses the nanostructures in the dispersion medium by causing crushing and dispersion of nanostructure aggregates by imparting shear force to the coarse dispersion liquid and by further applying back pressure to the coarse dispersion liquid, while cooling the coarse dispersion liquid as necessary in order to reduce air bubble formation. Dispersion treatment that brings about a crushing effect may be performed by using, for example, "BERYU SYSTEM PRO" (manufactured by BeRyu Corporation) and appropriately controlling the dispersion conditions.

As the dispersion treatment method for the coarse dispersion liquid, it is preferable to use a method that includes a dispersing step including at least one cycle of dispersing treatment in which pressure is applied to the coarse dispersion liquid containing the nanostructures and the dispersion medium, the coarse dispersion liquid is fed under pressure, and shear force is applied to the coarse dispersion liquid, wherein a plurality of repetitions of the dispersing step are performed while altering the pressure that is applied to the coarse dispersion liquid in the dispersing treatment (hereinafter also referred to as the "applied pressure"). It is further preferable that when the dispersing step is performed repeatedly while altering the applied pressure of the dispersing treatment, there is at least one instance in which the size by which the applied pressure is altered between consecutive repetitions of the dispersing step is at least 10 MPa.

The application of pressure to the coarse dispersion liquid and feeding of the coarse dispersion liquid under pressure such as to apply shear force to the coarse dispersion liquid can for example be performed by causing high-speed flow of the coarse dispersion liquid by a freely selected method, such as by spraying the pressurized coarse dispersion liquid from a nozzle, and thereby causing collisions such as between fluid and fluid, and between fluid and a flow path wall. More specifically, the dispersion treatment can be performed using a wet jet mill or a dispersion system such as "BERYU SYSTEM PRO" (manufactured by Beryu Corp.).

Filling Rate

The filling rate of the nanostructure dispersion liquid in the airtight container needs to be 97 vol % or more and 100 vol % or less, and is preferably 98 vol % or more and 99.5 vol % or less, where the capacity of the airtight container is 100 vol %. If the filling rate of the nanostructure dispersion liquid is less than 97 vol %, a decrease in dispersibility of the nanostructures contained in the nanostructure dispersion liquid in the container cannot be suppressed sufficiently. An excessively high filling rate, on the other hand, may lead to spilling of the nanostructure dispersion liquid from the container when the nanostructure dispersion liquid is subsequently used, or a rupture of the container. The filling of the airtight container with the nanostructure dispersion liquid is preferably performed in a nitrogen gas atmosphere or an argon gas atmosphere (i.e. inert gas atmosphere), or in a clean environment of class 10 or more.

Method of Storing Nanostructure Dispersion Liquid

The presently disclosed method of storing a nanostructure dispersion liquid includes storing a nanostructure dispersion liquid in a state of the nanostructure dispersion liquid-containing container described above. By storing the nanostructure dispersion liquid in a state of the nanostructure dispersion liquid-containing container described above, aggregation of nanostructures in the nanostructure dispersion liquid caused by environmental changes such as volatilization of the dispersion medium can be suppressed. This enables favorable storage of the nanostructure dispersion liquid for a long period of time such as 90 days or more and preferably 365 days or more.

The storage of the nanostructure dispersion liquid is preferably performed in an environment not exposed to direct sunlight, in a temperature range in which the liquid does not freeze and no air bubble formation due to volatilization of the liquid occurs.

Method of Transporting Nanostructure Dispersion Liquid

The presently disclosed method of transporting a nanostructure dispersion liquid includes transporting a nanostructure dispersion liquid in a state of the nanostructure dispersion liquid-containing container described above. The transport of the nanostructure dispersion liquid-containing container may be performed, for example, using a vehicle such as an automobile or a train, a ship, an aircraft, or a carriage, without being limited thereto.

By transporting the nanostructure dispersion liquid in a state of the nanostructure dispersion liquid-containing container described above, aggregation of nanostructures in the nanostructure dispersion liquid caused by, for example, environmental changes and vibrations during transport can be suppressed. This enables favorable transport of the nanostructure dispersion liquid for 8 hours or more and preferably 48 hours or more.

The transport of the nanostructure dispersion liquid is preferably performed in an environment not exposed to direct sunlight, in a temperature range in which the liquid does not freeze and no air bubble formation due to volatilization of the liquid occurs.

Method of Producing Composite Material Composition

The presently disclosed method of producing a composite material composition includes: a step of extracting a nanostructure dispersion liquid stored or transported by the method described above, from an airtight container; and a step of mixing the extracted nanostructure dispersion liquid and a matrix material to obtain a composite material composition. By using the nanostructure dispersion liquid stored or transported by the method described above, a composite material composition capable of forming a composite material having favorable material characteristics can be obtained. The step of extracting the nanostructure dispersion liquid may be performed using any known instrument or by dispensing directly from the airtight container, without being limited thereto. The step of obtaining a composite material composition may be performed by any known mixing method, without being limited thereto.

Examples of the matrix material include known matrix materials such as a polymer material, e.g. resin or rubber, and a metal material, e.g. metal or a metal compound.

Method of Producing Aggregate of Nanostructures

The presently disclosed method of producing an aggregate of nanostructures includes: a step of extracting a nanostructure dispersion liquid stored or transported by the method described above, from an airtight container; and a step of removing a dispersion medium from the extracted nanostructure dispersion liquid to form an aggregate of nanostructures. By using the nanostructure dispersion liquid stored or transported by the method described above, an aggregate of nanostructures having excellent characteristics can be formed. The step of extracting a nanostructure dispersion liquid may be performed using any known instrument or by dispensing directly from the airtight container, without being limited thereto. The step of forming an aggregate of nanostructures may be performed, for example, by a film formation method of applying the nanostructure dispersion liquid onto a film formation substrate and drying it or a film formation method of filtering the nanostructure dispersion liquid using a film formation substrate, without being limited thereto. The film formation substrate may be a known resin substrate or glass substrate.

EXAMPLES

The following provides a more specific explanation of the present disclosure based on examples. However, the present disclosure is not limited to the following examples.

Carbon nanotubes used in the examples and comparative examples were synthesized by a method described below. Furthermore, composite material shaped products that were produced in the examples and comparative examples were evaluated by a method described below.

Synthesis of Carbon Nanotubes

CNTs (SGCNTs-1) were prepared by the super growth method in accordance with the description in WO 2006/011655. In the preparation of the SGCNTs-1, formation of a catalyst layer on the surface of a substrate was performed by a wet process and a feedstock gas having acetylene as a main component was used.

The resultant SGCNTs-1 had a BET specific surface area of 1,050 $m^2/g$ (closed), a micropore volume of 0.44 mL/g, and when measured using a Raman spectrophotometer, exhibited a radial breathing mode (RBM) spectrum in a low wavenumber region from 100 $cm^{-1}$ to 300 $cm^{-1}$, which is characteristic of single-walled CNTs. Moreover, as a result of measuring the diameters and the lengths of 100 randomly selected SGCNTs-1 using a transmission electron microscope, it was found that the average diameter (Av) was 3.3 nm, the diameter standard deviation ($\sigma$) multiplied by 3 ($3\sigma$) was 1.9 nm, the ratio ($3\sigma$/Av) thereof was 0.58, and the average length was 500 μm. Moreover, a fully automated specific surface area analyzer (manufactured by Mountech Co., Ltd., product name "Macsorb® HM model-1210" (Macsorb is a registered trademark in Japan, other countries, or both)) was used to measure an adsorption isotherm of the SGCNTs-1, and a t-plot was created from the obtained adsorption isotherm by converting the relative pressure to an average thickness t (nm) of an adsorbed layer of nitrogen gas. The resultant t-plot exhibited a convex upward shape.

Evaluation Method

The electrical conductivity of a composite material shaped product was measured as described below by a method in accordance with JIS K7194 using a low-resistivity meter (manufactured by Mitsubishi Chemical Analytech, Co., Ltd.; product name: Loresta®-GP MCP-T610 (Loresta is a registered trademark in Japan, other countries, or both)).

Four square test pieces of 10 mm×10 mm were cut out from the composite material shaped product and were used as measurement samples. A PSP probe was selected for the 4-pin probe of the low-resistivity meter. Each of the measurement samples was fixed onto an insulating board, the probe was applied against the measurement sample at a central position (position 5 mm vertically and 5 mm laterally), and the electrical conductivity was measured while applying a voltage of 10 V. The electrical conductivities of the four measurement samples were measured and the average thereof was defined as the electrical conductivity of the composite material shaped product.

Example 1

After 10 g of the SGCNTs-1 used as nanostructures and 100 g of sodium lauryl sulfate used as a dispersant had been added to 9.89 kg of water, stirring was performed using a mixer to yield a coarse dispersion liquid. The resultant coarse dispersion liquid was loaded into a wet jet mill (manufactured by JOKOH Co., Ltd.; product name: JN1000) and was sequentially subjected to first to fourth dispersing step repetitions under the dispersing treatment conditions shown below to yield a carbon nanotube dispersion liquid 1 as a nanostructure dispersion liquid. The carbon nanotube dispersion liquid 1 was a homogeneous dispersion liquid that did not include visually identifiable particles.

First dispersing step repetition (applied pressure $P_1$: 90 MPa; number of treatment cycles $T_1$: 15)
Second dispersing step repetition (applied pressure $P_2$: 45 MPa;
number of treatment cycles $T_2$: 15)
Third dispersing step repetition (applied pressure $P_3$: 90 MPa; number of treatment cycles $T_3$: 15)
Fourth dispersing step repetition (applied pressure $P_4$: 45 MPa; number of treatment cycles $T_4$: 10).

Following this, an airtight container made of tin-plated steel with a capacity of 9 L was filled with 8.95 L of the resultant carbon nanotube dispersion liquid 1. During the filling, the dispersion liquid did not include visually identifiable aggregates or particles.

The airtight container filled with the carbon nanotube dispersion liquid 1 was then transported by a truck over a distance of 490 km for 8 hours. After arrival, whether or not the dispersion liquid included aggregates was checked. The dispersion liquid did not include visually identifiable aggregates or particles.

A composite material composition was obtained by mixing 100 g of the dispersion liquid after the arrival and 4950 mg of acrylonitrile-butadiene rubber latex (manufactured by ZEON Corporation; product name: Nipol® 1561 (Nipol is a registered trademark in Japan, other countries, or both)) in a beaker using a magnetic stirrer. The resultant composite material composition was poured into 500 mL of stirred 2-propanol to solidify a black crumb-form composite material. Thereafter, the composite material was collected from the 2-propanol by suction filtration and was dried by heating under reduced pressure (40° C., 18 hours) to yield 1897 mg of a composite material 1 (SGCNT-rubber composite). The composite material 1 was a flexible and rubbery substance.

Next, the produced composite material 1 was subjected to vacuum press shaping under a vacuum with conditions of a temperature of 120° C., a pressure of 0.4 MPa, and a pressurizing time of 5 minutes to form a composite material shaped product 1 having a thin-film disk shape of approximately 40 mm to 60 mm in diameter and 100 µm to 500 µm in thickness. The electrical conductivity of the resultant composite material shaped product 1 was measured to be 2.8 S/cm.

Example 2

A polystyrene solution was obtained by dissolving polystyrene (manufactured by Wako Pure Chemical Industries, Ltd., weight-average molecular weight: 73,000; weight-average molecular weight/number-average molecular weight: 3.8) in dimethylacetamide (DMAc) so as to have a concentration of 10 mg/mL. A coarse dispersion liquid was then obtained by stirring 6 g of the SGCNTs-1 and 12 L of the polystyrene solution for 2 hours in a tightly sealed container. The resultant coarse dispersion liquid was loaded into a wet jet mill (manufactured by JOKOH Co., Ltd.; product name: JN1000) and was sequentially subjected to first to fourth dispersing step repetitions under the dispersing treatment conditions shown below to yield a carbon nanotube dispersion liquid 2 as a nanostructure dispersion liquid. The carbon nanotube dispersion liquid 2 was a homogeneous dispersion liquid that did not include visually identifiable particles.

First dispersing step repetition (applied pressure $P_1$: 90 MPa; number of treatment cycles $T_1$: 15)
Second dispersing step repetition (applied pressure $P_2$: 40 MPa; number of treatment cycles $T_2$: 10)
Third dispersing step repetition (applied pressure $P_3$: 75 MPa; number of treatment cycles $T_3$: 15)
Fourth dispersing step repetition (applied pressure $P_4$: 25 MPa;
number of treatment cycles $T_4$: 12).

Following this, a polyethylene airtight container (UN standard compliant product) with a capacity of 10 L was filled with 9.94 L of the resultant carbon nanotube dispersion liquid 2. During the filling, the dispersion liquid did not include visually identifiable aggregates or particles.

The airtight container filled with the carbon nanotube dispersion liquid 2 was then transported by a truck over a distance of 150 km for 4 hours. After this, whether or not the dispersion liquid included aggregates was checked. The dispersion liquid did not include visually identifiable aggregates or particles.

Additional polystyrene was dissolved in the dispersion liquid after arrival in order to increase the polystyrene concentration to 50 mg/mL. The resultant liquid was dripped into a stirred 2-propanol solution to cause solidification of a composite material. Liquid content and solid content (composite material) were separated on a metal mesh. Thereafter, the solid content was dried for 18 hours under reduced pressure at 40° C. to obtain a composite material 2. The composite material 2 was a hard, black solid of undefined structure. This solid was hot pressed in a mold to obtain a composite material shaped product 2 measuring 3 cm×3 cm and having a thickness of 2 mm. The electrical conductivity of the resultant composite material shaped product 2 was measured to be 0.0005 S/cm.

Example 3

The SGCNTs-1 (1 g) as nanostructures were stirred in 250 mL of nitric acid of 7.7 M for 8 hours, and refluxed at 125° C. for 12 hours, to perform purification. After this, 1800 mL of ultrapure water was added, and an ultrasonic irradiator (manufactured by Honda Electronics Co., Ltd., product name "WTC-1200-40") was used to perform ultrasonic treatment at 40 kHz for 60 minutes. Subsequently, a ceramic film of 0.02 µm was used to perform cross flow filtration until the pH reached 4.0. Liquid that had passed through the ceramic film was discarded as transmitted liquid, and liquid that had not passed through the pores of the filter was collected as retained liquid. Thereafter, 0.1 mass % of ammonia water was added to the retained liquid, to readjust the pH of the retained liquid to 7.1. Ultrasonic treatment was then performed for 2 hours using an ultrasonic irradiator.

Thereafter, a cycle of performing centrifuging using an ultracentrifuge (manufactured by Hitachi Koki Co., Ltd., product name "CP-80NX") at 10000 G for 20 minutes and collecting supernatant liquid in a clean booth of class 10 was repeatedly performed four times, thus obtaining a carbon nanotube dispersion liquid 3. These operations were repeated until 1.2 L or more of the carbon nanotube dispersion liquid was obtained. Following this, a polyethylene airtight container (manufactured by Sanplatec Co., Ltd., acid-cleaned bottle) with a capacity of 1 L was filled with the resultant carbon nanotube dispersion liquid 3 (0.98 L) in a clean booth of class 10. During the filling, the dispersion liquid did not include visually identifiable aggregates or particles.

The airtight container filled with the carbon nanotube dispersion liquid 3 was then shaken (150 rpm) for 24 hours using a shaker. After this, whether or not the dispersion liquid included aggregates was checked. The dispersion liquid did not include visually identifiable aggregates or particles.

The dispersion liquid after the shaking was filtrated with a filter (manufactured by Pall Corporation, aperture: 0.4 μm), and changes in absorbance of the dispersion liquid between before and after the filtration were measured by an ultraviolet and visible spectrophotometer (manufactured by JASCO Corporation, "V7200"). The absorbance at 450 nm after the filtration was 70% of the absorbance before the filtration.

Example 4

In the production of the carbon nanotube dispersion liquid in Example 3, the steps were changed so that ammonium nitrate as ion particles was added in addition to ammonia water so as to have a concentration of 100 ppm, thus obtaining a carbon nanotube dispersion liquid 4. As a result of performing the same filling, shaking, and analysis as the carbon nanotube dispersion liquid 3, the absorbance at 450 nm after the filtration was 82% of the absorbance before the filtration.

Example 5

In the production of the carbon nanotube dispersion liquid in Example 3, octakis(tetramethylammonium)-T8-silsesquioxane (manufactured by Aldrich) as a molecular additive was added to the supernatant liquid after the centrifuging so as to have a Si concentration of 50 ppm, thus obtaining a carbon nanotube dispersion liquid 5. As a result of performing the same filling, shaking, and analysis as the carbon nanotube dispersion liquid 3, the absorbance at 450 nm after the filtration was 78% of the absorbance before the filtration.

Example 6

The SGCNTs-1 were subjected to in-liquid plasma treatment to obtain modified SGCNTs. Specifically, in-liquid plasma treatment was performed by the following procedure. 1 g of the SGCNTs-1 was added to 3 L of water, and plasma treatment was performed using an in-liquid plasma generator (manufactured by Cup-kurita Corporation, "MPP-HV04") while stirring. The modified SGCNTs were thus obtained. A carbon nanotube dispersion liquid 6 was obtained in the same way as in Example 3, except that the SGCNTs-1 were changed to the modified SGCNTs. As a result of performing the same filling, shaking, and analysis as the carbon nanotube dispersion liquid 3, the absorbance at 450 nm after the filtration was 78% of the absorbance before the filtration.

Comparative Example 1

The same operations as in Example 1 were performed, except that the amount of the carbon nanotube dispersion liquid 1 with which the airtight container with a capacity of 10 L was filled was changed to 6.55 L.

The resultant dispersion liquid after the transport included many visually identifiable particles.

Moreover, the electrical conductivity of the composite material shaped product was low, i.e. 0.13 S/cm.

Comparative Example 2

The same operations as in Example 2 were performed, except that the amount of the carbon nanotube dispersion liquid 2 with which the airtight container with a capacity of 10 L was filled was changed to 7.25 L.

The resultant dispersion liquid after the transport included many visually identifiable particles.

Moreover, the electrical conductivity of the composite material shaped product was low, i.e. 0.00004 S/cm.

Comparative Example 3

The same operations as in Example 3 were performed, except that the amount of the carbon nanotube dispersion liquid 3 with which the airtight container with a capacity of 1 L was filled was changed to 0.63 L.

The resultant dispersion liquid after the shaking included many visually identifiable particles.

Due to the presence or many particles, the absorbance was not measurable.

INDUSTRIAL APPLICABILITY

It is thus possible to provide a nanostructure dispersion liquid-containing container that, even in the case of being stored or transported, can suppress a decrease in dispersibility of nanostructures contained in a nanostructure dispersion liquid in the container.

The invention claimed is:

1. A nanostructure dispersion liquid-containing container formed by filling an airtight container with a nanostructure dispersion liquid containing nanostructures and a dispersion medium,
    wherein the nanostructures are fibrous carbon nanostructures that exhibit a convex upward shape in a t-plot obtained from an adsorption isotherm,
    a filling rate of the nanostructure dispersion liquid is 97 vol % or more, and
    the nanostructure dispersion liquid further contains ion particles.

2. The nanostructure dispersion liquid-containing container according to claim 1,
    wherein the nanostructure dispersion liquid further contains a molecular additive.

3. The nanostructure dispersion liquid-containing container according to claim 1,
    wherein the airtight container is made of resin or metal.

4. A method of storing a nanostructure dispersion liquid, comprising storing a nanostructure dispersion liquid in a state of the nanostructure dispersion liquid-containing container according to claim 1.

5. A method of producing a composite material composition, comprising:
  extracting a nanostructure dispersion liquid stored by the method of storing a nanostructure dispersion liquid according to claim 4 from an airtight container; and
  mixing the extracted nanostructure dispersion liquid and a matrix material to obtain a composite material composition.

6. A method of producing an aggregate of nanostructures, comprising:
  extracting a nanostructure dispersion liquid stored by the method of storing a nanostructure dispersion liquid according to claim 4 from an airtight container; and
  removing a dispersion medium from the extracted nanostructure dispersion liquid to form an aggregate of nanostructures.

7. A method of transporting a nanostructure dispersion liquid, comprising
  transporting a nanostructure dispersion liquid in a state of the nanostructure dispersion liquid-containing container according to claim 1.

8. A method of producing a composite material composition, comprising:
  extracting a nanostructure dispersion liquid transported by the method of transporting a nanostructure dispersion liquid according to claim 7 from an airtight container; and
  mixing the extracted nanostructure dispersion liquid and a matrix material to obtain a composite material composition.

9. A method of producing an aggregate of nanostructures, comprising:
  extracting a nanostructure dispersion liquid transported by the method of transporting a nanostructure dispersion liquid according to claim 7, from an airtight container; and
  removing a dispersion medium from the extracted nanostructure dispersion liquid to form an aggregate of nanostructures.

10. The nanostructure dispersion liquid-containing container according to claim 1,
  wherein the ion particles are at least one selected from the group consisting of ammonium nitrate, ammonium carbonate, ammonium bicarbonate, ammonium formate, ammonium acetate, ionic organic species, and ionic polymer.

* * * * *